United States Patent [19]

Winter et al.

[11] 3,917,596
[45] Nov. 4, 1975

[54] 9-(14-PHENYL-PIPERAZINO)-ALKYL)-ADENINES

[75] Inventors: Werner Winter, Viernheim; Max Thiel, Mannheim; Kurt Stach, Mannheim-Waldhof; Wolfgang Schaumann, Heidelberg; Androniki Roesch, Lampertheim, all of Germany

[73] Assignee: Boehringer Mannheim GmbH, Mannheim, Germany

[22] Filed: Sept. 4, 1973

[21] Appl. No.: 394,366

[30] Foreign Application Priority Data
  Sept. 14, 1972  Germany............................ 2245061

[52] U.S. Cl. ............... 260/252; 260/253; 424/253; 424/232
[51] Int. Cl.² ........................................ C07D 473/34
[58] Field of Search............................ 260/252, 253

[56] References Cited
FOREIGN PATENTS OR APPLICATIONS
  621,979  2/1963  Belgium............................... 260/252

Primary Examiner—Donald G. Daus
Assistant Examiner—Anne Marie T. Tighe
Attorney, Agent, or Firm—Burgess, Dinklage & Sprung

[57] ABSTRACT

A 9-[(4-phenyl-piperazino)-alkyl]-adenine of the formula

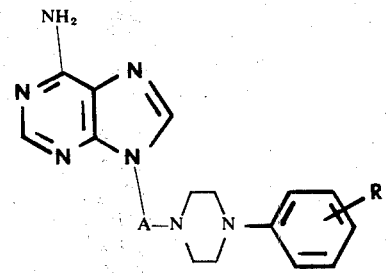

(I)

wherein
  A is a lower alkylene radical, and
  R is a hydrogen or halogen atom or a lower alkoxy radical, or a salt thereof with a pharmacologically compatible acid, which compounds are characterized by marked anti-edematous activity as well as by activity in reducing capillary permeability.

9 Claims, No Drawings

9-(14-PHENYL-PIPERAZINO)-ALKYL)-ADENINES

The present invention is concerned with new aryl-piperazine derivatives of adenine, with the preparation thereof and with combatting edema using these derivatives and compositions thereof.

The new aryl-piperazine derivatives of adenine according to the present invention are compounds of the formula

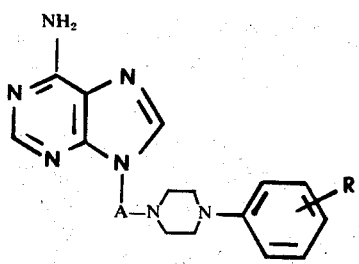

wherein
A is a lower alkylene radical, and
R is a hydrogen or halogen atom or a lower alkoxy radical, and the salts thereof with pharmacologically compatible acids.

We have found that the new compounds of general formula (I) have an anti-edematous action and reduce the capillary permeability. They can suppress the liberation and the action of histamine and serotonin and thus also have an anti-inflammatory and anti-allergic activity.

The new compounds (I) according to the present invention can be prepared, for example, by reacting adenine or a salt thereof with an aryl-piperazine derivative of the formula

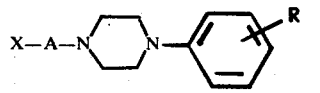

wherein A and R have the same meanings as above and X is a reactive residue, whereafter, if desired, the product obtained is converted into a pharmacologically compatible salt.

The straight-chained or branched alkylene chain A advantageously has 2 to about 5 and preferably 3 or 4 carbon atoms. Thus, the radical A can be, for example, an ethylene, propylene, trimethylene, 1,2-butylene, 1,2-iso-butylene, tetramethylene, 1,3-butylene, pentamethylene, 1,2-amylene or 1,3-amylene chain.

When R is a halogen atom, it can be a fluorine, chlorine or bromine atom. When R is a lower alkoxy radical, it can contain 1 to about 5 and preferably contains 1 to 3 carbon atoms and it can be straight-chained or branched. Examples of such radicals include methoxy, ethoxy, n-propoxy, iso-propoxy, n-butoxy, isobutoxy, tert.-butoxy, n-pentoxy or neopentoxy radicals.

As reactive residues X, there are to be understood residues which are commonly used in organic chemistry for the alkylation of amines. Since alkyl halides and reactive sulfonates are especially suitable for this reaction, the reactive residue X is preferably a bromine or chlorine atom or a tosyloxy, mesyloxy or brosyloxy radical.

The reaction of adenine with compounds of the general formula (II) is preferably carried out in an alkaline medium, especially in a lower alcohol, for example in isopropanol in the presence of sodium isopropylate. Under these conditions, the compounds of the general formula (I) are obtained, together with small amounts of the isomeric derivatives substituted in the 7-position, which can, however, easily be removed by a simple recrystallization of the reaction products. (With regard to the 9-substitution of adenine in an alkaline medium, see also "The Chemistry of Heterocyclic Compounds": Fused Pyrimidines, Part II, Purines, pub. Wiley-Interscience, page 342).

The compounds of general formula (II) are either known compounds or can easily be prepared from known compounds using simple, known methods.

The pharmacologically compatible salts are obtained in the usual manner, for example by neutralization of the compounds (I) with non-toxic inorganic or organic acids, for example with hydrochloric acid, sulfuric acid, phosphoric acid, hydrobromic acid, acetic acid, lactic acid, citric acid, malic acid, salicylic acid, malonic acid, maleic acid, succinic acid, and the like.

The new compounds according to the present invention can be administered per se or in the form of the pharmacologically compatible salts. They can be administered enterally and parenterally in admixture with solid or liquid pharmaceutical diluents or carriers, for which purpose there can be used all of the conventional forms of administration, for example, tablets, capsules, dragees, syrups, solutions, suspensions, and the like. As injection medium, water is preferably used which contains the usual additives for injection solutions, such as stabilizing agents, solubilizing agents and buffers. Additives of this kind include, for example, tartrate and citrate buffers, ethanol, complex-forming agents (for example ethylenediamine-tetraacetic acid and the non-toxic salts thereof), and high molecular weight polymers (for example liquid polyethylene oxide) for viscosity regulation. Liquid carrier materials for injection solutions must be sterile and are preferably placed in ampules. Solid carrier materials include, for example, starch, lactose, mannitol, methyl cellulose, talc, highly-dispersed silicic acid, high molecular weight fatty acids (for example stearic acid), gelatin, agar-agar, calcium phosphate, magnesium stearate, animal and vegetable fats and solid high molecular weight polymers (for example polyethylene glycols); compositions suitable for oral administration can, if desired, also contain flavoring and sweetening agents.

The following Example is given for the purpose of illustrating the present invention:

EXAMPLE

Preparation of
9-[3-(4-phenyl-piperazino)-propyl]-adenine.

1.61 g of sodium are dissolved in 17.5 ml of isopropanol. 9.4 g of adenine are added to this solution and the reaction mixture is then heated under reflux for 10 minutes, whereafter 17.2 g of 3-(4-phenyl-piperazino)-propyl chloride in 25 ml of isopropanol are added thereto. This mixture is then heated under reflux for 8 hours, while stirring. Thereafter, the reaction mixture is cooled and filtered with suction and the sodium chloride present in the residue washed out with water. The water-washed and dried product is recrystallized from dioxane. There are obtained 14.1 g (58% theory) of 9-[3-(4-phenyl-piperazino)-propyl]-adenine, which melts at 187° – 188°C.

The following compounds are prepared in an analogous manner:

9-[3-(4-phenyl-piperazino)-2-methyl-propyl]-adenine from adenine and 3-(4-phenyl-piperazino)-2-methyl-propyl chloride; yield 64% of theory; m.p. 177° – 178°C. (recrystallized from dioxane-ether);

9-[3-[4-(2-chlorophenyl)-piperazino]-propyl]-adenine from adenine and 3-[4-(2-chlorophenyl)-piperazino]-propyl chloride; yield 58% of theory; m.p. 155° – 156°C. (recrystallized from isopropanol-ether);

9-[3-[4-(3-chlorophenyl)-piperazino]-propyl]-adenine from adenine and 3-[4-(3-chlorophenyl)-piperazino]-propyl chloride; yield 58% of theory; m.p. 181° – 182°C. (recrystallized from dioxane-ether);

9-[3-[4-(4-chlorophenyl)-piperazino]-propyl]-adenine from adenine and 3-[4-(4-chlorophenyl)-piperazino]-propyl chloride; yield 75% of theory; m.p. 200° – 202°C. (recrystallized from dioxane);

9-[3-[4-(2-methoxyphenyl)-piperazino]-propyl]-adenine from adenine and 3-[4-(2-methoxyphenyl)-piperazino]-propyl chloride; yield 56% of theory; m.p. 172° – 174°C. (recrystallized from isopropanol);

9-[3-[4-(4-methoxyphenyl)-piperazino]-propyl]-adenine from adenine and 3-[4-(4-methoxyphenyl)-piperazino]-propyl chloride; yield 58% of theory; m.p. 185° – 186°C. recrystallized from ethanol/water).

The new compounds of this invention have anti-edematous activity and reduce capillary permeability. They can suppress the liberation, or the activity, of histamine and serotonin and, thus, also have an anti-inflammatory and anti-allergic action.

Benzarone, a substance commercially available under the trademark "Fragivix", i.e. 2-ethyl-3-(4'-hydroxybenzoyl)-benzo-furan, for the treatment of damage to the peripheral capillary vascular wall, was used as a comparison compound.

The anaphylactic reaction in rats caused by the intravenous injection of dextran was used as the test method for comparison of the substances set forth in the table. After liberation of histamine, serotonin and other vasoactive substances from the mast cells (mastocytes, labrocytes), the capillary permeability is increased by dextran. As a result, edema and itching occur, particularly in the area of the acres. Edema is accompanied by an increase of the hematocritic value.

The activity of each substance was determined by measuring the reduction of the increase in hematocritic value caused by dextran injection. The effective dose, ED, was calculated from the individual values, being that dosage which reduces the increase in hemotrocritic value by 50% and represents a significant difference over the control animals (p < 0.05). The comparative substance Benzarone had a much weaker action — as is evident from the table.

TABLE

| Test Compound | $ED_{50\%}$, mg/kg, i.p. |
| --- | --- |
| Benzarone | >100* |
| 9-[3-(4-phenyl-piperazino)-propyl]-adenine | 2.2 |
| 9-[3-(4-phenyl-piperazino)-2-methyl-propyl]-adenine | ~6.2 |
| 9-[3-[4-(2-chlorophenyl)-piperazino]-propyl]-adenine | 4.5 |
| 9-[3-[4-(3-chlorophenyl)-piperazino]-propyl]-adenine | 6.4 |
| 9-[3-[4-(4-chlorophenyl)-piperazino]-propyl]-adenine | ~6 |
| 9-[3-[4-(2-methoxyphenyl)-piperazino]-propyl]-adenine | 4.8 |
| 9-[3-[4-(4-methoxyphenyl)-piperazino]-propyl]-adenine | 8.3 |

*at this dosage only 25% reduction (p <0.01)

With respect to the proper dosage and methods of application for the instant compounds, these are comparable to those for the commerically known compound "Fragivix", which has been described in connection with the comparative tests set forth in the Table above. The instant compounds make possible comprehensive therapy of acute as well as chronic phlebological and capillary afflictions as well as varicose syndromes. The instant compounds retard reactions leading to edemas and swellings, including those of allergic origin.

The typial daily dosage of 10 to 300 mg results in reducing or eliminating the above afflictions, commonly within some days. A preferred dosage is 30–100 mg.

It will be understood that the specification and examples are illustrative but not limitative of the present invention and that other embodiments within the spirit and scope of the invention will suggest themselves to those skilled in the art.

What is claimed is:

1. A 9-[(4-phenyl-piperazino)-alkyl]-adenine of the formula

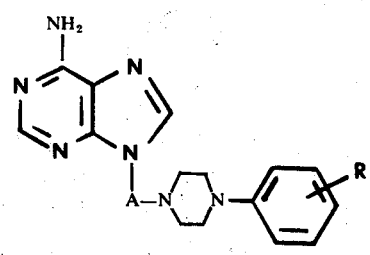

wherein
A is a lower alkylene radical having 2 to 5 carbon atoms, and
R is a hydrogen or halogen atom or a lower alkoxy radical having up to 5 carbon atoms,
or a salt thereof with a pharmacologically compatible acid.

2. A compound according to claim 1 wherein A has 2 to 5 carbon atoms and R is hydrogen, fluorine, chlorine, bromine or alkoxy of 1 to 5 carbon atoms.

3. A compound according to claim 1 wherein A has 3 or 4 carbon atoms and R is hydrogen, chlorine or alkoxy of 1 to 3 carbon atoms.

4. A compound according to claim 1 wherein such compound is 9-[3-(4-phenyl-piperazino)-propyl]-adenine or a salt thereof with a pharmacologically compatible acid.

5. A compound according to claim 1 wherein such compound is 9-[3-(4-phenyl-piperazino)-2-methyl-propyl]-adenine or a salt thereof with a pharmacologically compatible acid.

6. A compound according to claim 1 wherein such compound is 9-[3-[4-(2-chlorophenyl)-piperazino]-propyl]-adenine or a salt thereof with a pharmacologically compatible acid.

7. A compound according to claim 1 wherein such compound is 9-[3-[4-(3-chlorophenyl)-piperazino]-propyl]-adenine or a salt thereof with a pharmacologically compatible acid.

8. A compound according to claim 1 wherein such compound is 9-[3-[4-(4-chlorophenyl)-piperazino]-propyl]-adenine or a salt thereof with a pharmacologically compatible acid.

9. A compound according to claim 1 wherein such compound is 9-[3-[4-(2-methoxy-phenyl)-piperazino]-propyl]-adenine or a salt thereof with pharmacologically compatible acid.

* * * * *